US010462055B2

United States Patent
Surcouf et al.

(10) Patent No.: US 10,462,055 B2
(45) Date of Patent: Oct. 29, 2019

(54) CONTENT DISTRIBUTION SYSTEM CACHE MANAGEMENT

(71) Applicant: Cisco Technology, Inc., San Jose, CA (US)

(72) Inventors: Andre Surcouf, St. Lew-la-Foret (FR); William Mark Townsley, Paris (FR); Stefano Benedetto Previdi, Rome (IT); Eric Vyncke, Alleur (BE)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 14/803,162

(22) Filed: Jul. 20, 2015

(65) Prior Publication Data

US 2017/0026286 A1   Jan. 26, 2017

(51) Int. Cl.
*H04L 12/747* (2013.01)
*H04L 12/741* (2013.01)
*H04L 29/08* (2006.01)

(52) U.S. Cl.
CPC .......... *H04L 45/742* (2013.01); *H04L 45/745* (2013.01); *H04L 67/1097* (2013.01); *H04L 67/2842* (2013.01)

(58) Field of Classification Search
CPC ............. G06F 17/30091; H04L 45/742; H04L 45/745; H04L 67/1097
USPC ........................................................ 709/203
See application file for complete search history.

(56) References Cited

U.S. PATENT DOCUMENTS

| | | | | | |
|---|---|---|---|---|---|
| 5,933,849 | A | * | 8/1999 | Srbljic | ................ G06F 12/0813 707/E17.12 |
| 2003/0204602 | A1 | * | 10/2003 | Hudson | .................. D01D 5/423 709/228 |
| 2004/0098539 | A1 | * | 5/2004 | Frank | ................ G06F 17/30067 711/118 |
| 2005/0197908 | A1 | * | 9/2005 | Asami | ................ G06Q 30/0601 705/26.1 |
| 2011/0016526 | A1 | * | 1/2011 | Oh | ....................... H04L 63/1458 726/23 |
| 2011/0107030 | A1 | | 5/2011 | Borst et al. | |
| 2016/0330500 | A1 | * | 11/2016 | Houdaille | ........... H04L 65/4084 |

* cited by examiner

*Primary Examiner* — William G Trost, IV
*Assistant Examiner* — Christopher P Cadorna
(74) *Attorney, Agent, or Firm* — Merchant & Gould P.C.

(57) ABSTRACT

Content distribution system cache management may be provided. First, a sync packet may be received by a cache server from a first server. The sync packet may include a list indicating a cache server where a chunk is to be stored and the address for the chunk. Next, an address for the chunk may be obtained by the cache server by parsing the sync packet. The cache server may then determine that the chunk is not stored on the cache server by using the address for the chunk. Next, in response to determining that the chunk is not stored on the cache server, a connection may be opened between the first server and the cache server. The cache server may then receive the chunk over the connection and cache the chunk on the cache server.

20 Claims, 5 Drawing Sheets

CONTENT DISTRIBUTION SYSTEM CACHE MANAGEMENT

TECHNICAL FIELD

The present disclosure relates generally to content distribution system management.

BACKGROUND

Segment Routing (SR) allows any node to select any path for each of its traffic classes. The path does not depend on a hop-by-hop signaling technique. It only depends on a set of "segments" that are advertised by the Intermediate System to Intermediate System (IS-IS) routing protocol. These segments act as topological sub-paths that can be combined together to form the desired path. There are two forms of segments: node and adjacency. A node segment represents a path to a node. An adjacency segment represents a specific adjacency to a node.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
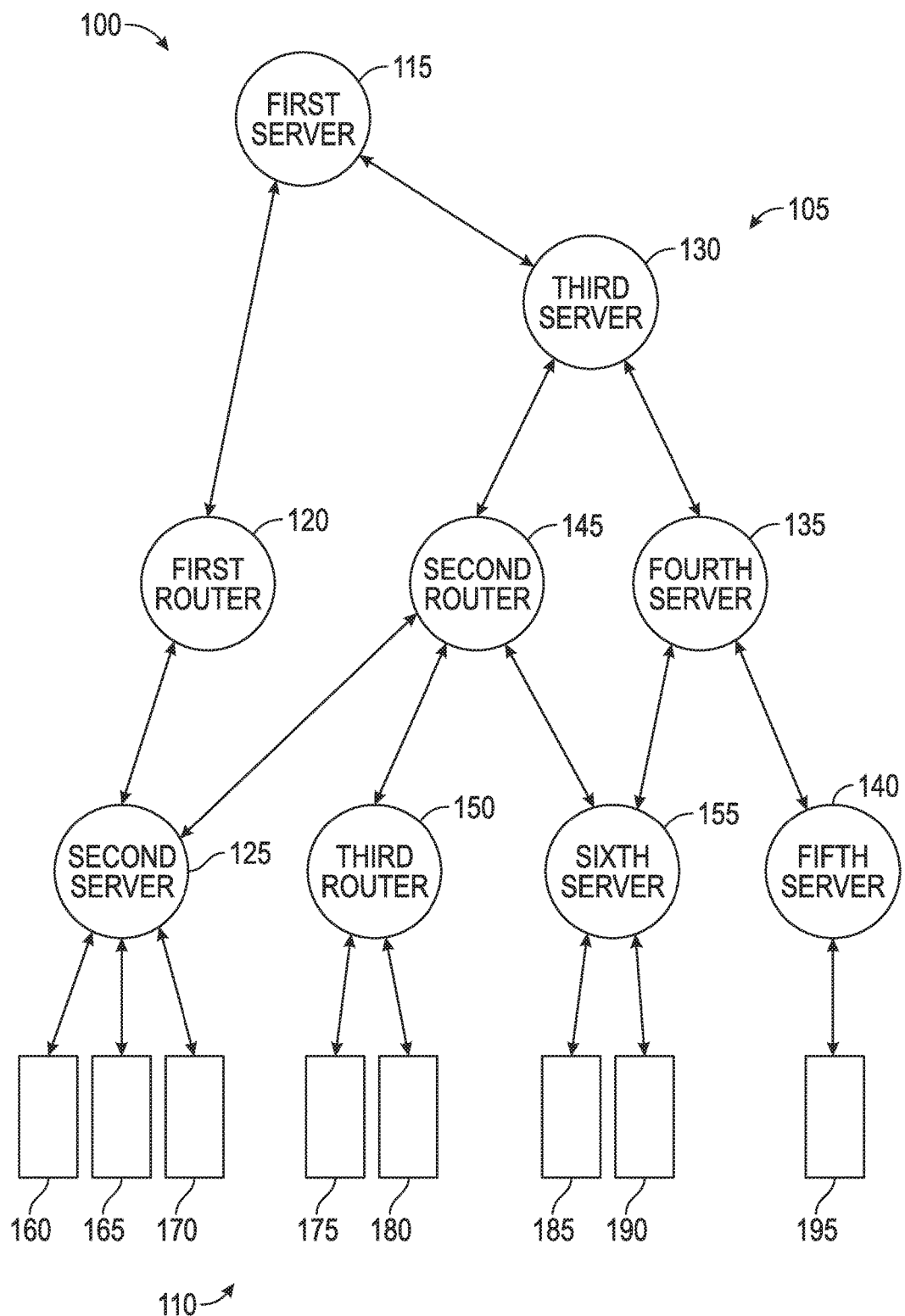
FIG. 1 is a block diagram of an operating environment for providing content distribution system cache management in accordance with at least one example embodiment.

Content distribution system cache management may be provided. First, a sync packet may be received by a cache server from a first server. The sync packet may include a list indicating a cache server where a chunk is to be stored and the address for the chunk. Next, an address for the chunk may be obtained by the cache server by parsing the sync packet. The cache server may then determine that the chunk is not stored on the cache server by using the address for the chunk. Next, in response to determining that the chunk is not stored on the cache server, a connection may be opened between the first server and the cache server. The cache server may then receive the chunk over the connection and cache the chunk on the cache server.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Conventional content distribution systems (CDN) utilize a collection of web protocols paradigm (e.g., Hypertext Transfer Protocol (HTTP)) all operating at the application layers. While this may work well, they all share a number of design tradeoffs mostly due to their reliance on Domain Name System (DNS)+HTTP/Transmission Control Protocol (TCP)/Internet Protocol (IP) as the underlying protocol infrastructure. This may result in a number of limitations and technical tradeoffs that may not be good for streaming contents such as video. These limitations and technical tradeoffs may include: i) reliance on DNS combined with well-known servers for discovering delivery points may enforce a fairly static distribution model; ii) using a point-to-point transport like TCP may eliminate the ability to exploit multi-destination delivery as may be possible in the IP protocol architecture by using, for example, multicast; iii) the use of HTTP may limit the granularity of fetch operations to be relatively coarse due to the high cost of an HTTP transaction compared to a simple packet transmission; iv) the need for sophisticated caching strategies to provide bandwidth and server load scaling may lead to the deployment of custom, heavyweight CDN approaches (e.g., complex and hard to manage load balancers, DNS tricks, etc.); and v) partly due to the complexity of their management, CDN caching optimization may be complex to achieve as it may require individual cache control and management.

Embodiments of the disclosure may utilize Segment Routing (SR) protocol architectures in addressing some of the aforementioned limitations and technical tradeoffs. In particular, the data-centric object fetch approach at the inter-networking layer may make the design of more optimal content delivery systems possible. Symmetrically, the shift from centralized distribution to a data-centric object fetch approach may make possible the design of more optimal caching systems consistent with embodiments of the disclosure.

Centralized caches, such as CDNs, may be relatively easy to manage whereas managing a distributed-in-the-network set of caches of a comparable global size may create additional problems to solve. One advantage of distributed caches is that it may allow the CDN traffic to be kept close to the endpoint device accessing the content. Embodiments of the disclosure may include individual caches that may be smaller in order to make a global caching system more dynamic and capable of rapidly adapting to content consumption patterns.

Embodiments of the disclosure may leverage Internet Protocol version 6 (IPv6) SR properties combined with an interception process to provide management of a distributed set of CDN content caches as well as corresponding cache entries. Embodiments of the disclosure may also include a set of atomic operations (e.g., that may leverage the interception process) as well as some in-the-network autonomous and distributed cache management policies.

FIG. 1 is a block diagram of an operating environment 100 in accordance with embodiments of the disclosure. For example, operating environment 100 may comprise any type of network (e.g., the Internet, a hybrid fiber-coaxial (HFC) network, a content delivery network (CDN), etc.). As shown in FIG. 1, operating environment 100 may comprise a plurality of nodes 105 and a plurality of user devices 110. Plurality of nodes 105 may comprise, for example, network devices. The network devices may comprise, but are not limited to, servers, switches, and routers. Plurality of nodes 105 may comprise first server 115, first router 120, second server 125, third server 130, fourth server 135, fifth server 140, second router 145, third router 150, and sixth server 155.

Each of plurality of user devices 110 may comprise a communication terminal that may comprise, but is not limited to, a set-top box (STB), a digital video recorder, a cable modem, a personal computer, a Wi-Fi access point, a cellular base station, a switch servicing multiple clients in a vicinity, a tablet device, a mobile device, a smart phone, a telephone, a remote control device, a network computer, a mainframe, a router, or other similar device. Plurality of user devices 110 may comprise a first user device 160, a second user device 165, a third user device 170, a fourth user device 175, a fifth user device 180, a sixth user device 185, a seventh user device 190, and an eighth user device 195.

Operating environment 100 may comprise nodes capable of delivering content. Operating environment 100 may not comprise an exact network configuration, but rather it may comprise a content distribution network overlay. As a consequence, for example, any edge between two nodes may be a logical edge that can physically go through any type of network artifact.

First server 115 may comprise a top level server (e.g., source server) from which content may be fetched. Plurality of user devices 110 may be connected to the edges of operating environment 100. Consistent with embodiments of the disclosure, IPv6 SR properties may not be used only for content delivery purpose, but may also be used to populate CDN caches that may be distributed across operating environment 100.

Content service providers may start pushing content into operating environment 100 (e.g., CDN) in order to service ones of plurality of user devices 110. In doing so, the content service providers may want to distribute content on different caches within the CDN internal network. Embodiments of the disclosure may use SR combined with the aforementioned interception process to achieve chunk caching on CDN nodes (e.g., plurality of nodes 105). In order to achieve this, embodiments of the disclosure may define a special organization of an SR list (e.g., in a packet) combined with the src and dst addresses in the list so that a CDN cache server (e.g., ones of the plurality of nodes 105) may know what to do.

Figure 2:
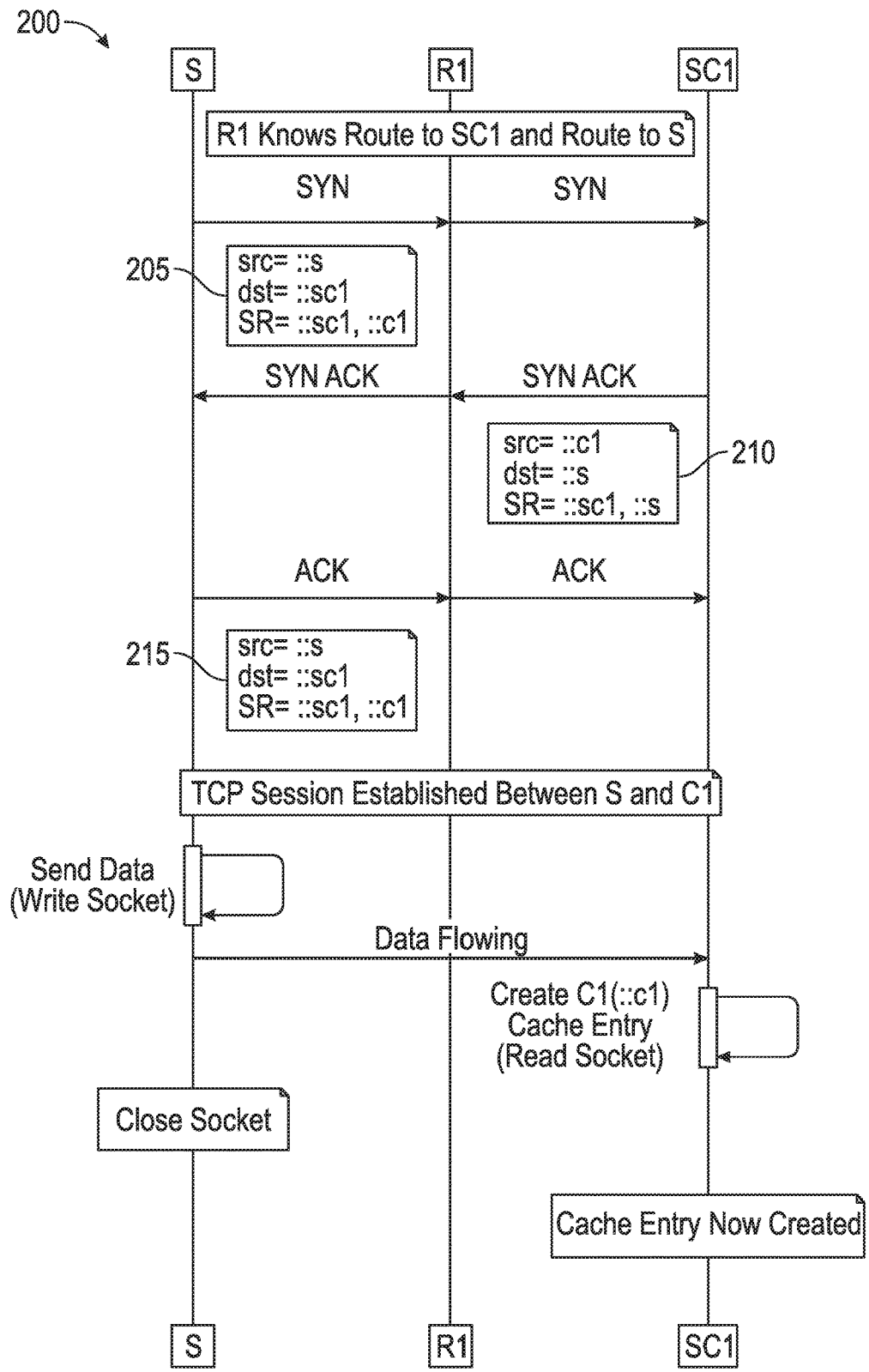
FIG. 2 is a state diagram for a caching method in accordance with at least one example embodiment.

FIG. 2 shows a state diagram for atomic caching method 200 using the aforementioned interception process consistent with embodiments of the disclosure. As shown in FIG. 2, S, R1, and SC1 may comprise ones of plurality of nodes 105 described above with respect to FIG. 1. For example, S may comprise first server 115, R1 may comprise first router 120, and SC1 may comprise second server 125. S, R1, and SC1 may comprise other nodes in operating environment 100 and are not limited to first server 115, first router 120, and second server 125. The process of method 200 may create a C1 (i.e., chunk C1) cache entry in SC1 cache. An external SR capable server (e.g., S) may be connected to the network (e.g., operating environment 100). By convention, ::s may be the v6 @IP of this SR capable server (e.g., S).

An application hosted in S may open a socket against ::c1 (e.g., the chunk to cache in SC1). To achieve this, S may:
    setsockopt (SR=::sc1, ::c1)
    connect (::c1)

As a result of the above, S may internally create a sync packet 205 comprising:
    src=::s
    dst=::sc1
    SR=::sc1, ::c1
sync packet 205 may represent a list of cache servers where the chunk C1 may be cached. In this example, the SR list in sync packet 205 may be limited to SC1. S then sends the packet.

From S, sync packet 205 may reach R1 that may have a route toward SC1. In response, R1 may send sync packet 205 to SC1. SC1 may then receive sync packet 205. Because SC1 may be SR capable, SC1 may open sync packet 205 and parse sync packet 205's segment routing header (SRH). Since SC1 may comprise a cache server, SC1 may determine that the last v6 @IP represents a chunk to be cached at SC1. Next, SC1 may use the last address from sync packet 205 and may do a lookup in its internal chunk table. In this case, there may be no match in SC1's internal chunk table, which means SC1 may not contain chunk C1. Different ways of using ::sc1, ::c1 to achieve chunk caching may be used including, but not limited to, loadable kernel module or VPP based.

As shown in FIG. 2, opposed to content hunting, a cache miss may trigger the interception process. In this example, since there may be a cache miss, SC1 may intercept sync packet 205 and a TCP connection may be established between S and C1. At this stage, the interception process may start. Now that the SYN may be at the right place, the interception process may now determine what to do for the return path (e.g., the SYN ACK as shown in FIG. 2).

At this point, SC1 may have been elected as the server that may cache the C1 chunk. It also may mean that a socket may be opened between ::s and ::c1. Since there was a cache miss (similar to a service hit), SC1 may respond with a sync/acknowledge packet 210. To do so, SC1 may create sync/acknowledge packet 210:
    src=::c1
    dst=::s
    SR=::sc1, ::s
SC1 may send sync/acknowledge packet 210. Sync/acknowledge packet 210 may hit R1 that has a route toward S. S may receive sync/acknowledge packet 210 packet and respond with a acknowledge packet 215:
    src=::s
    dst=::sc1
    SR=::sc1, ::c1
From this moment onward, there may be a socket opened between ::s and ::c1 that may be used for caching the chunk ::c1. S may write chunk data from C1 in the socket while SC1 will read the chunk data from the same socket and will create the corresponding cache entry in SC1. When finished, the operating system (OS) may close the socket, which may end the C1 chunk caching process.

If a cache hit had happened above rather than a cache miss, this may have meant C1 is already present in SC1's cache in which case SC1 may reject the cache request. Because in this example, there is no other SCx present in the SR list, SC1 may not send a SYN-ACK, but will rather send a RESET. There might be a problem for S to correctly interpret this RESET since there may not be a way to make a distinction between this RESET and an accidental reset. It may not matter since S can interpret it as a "fail to cache".

FIG. 2 shows how a cache miss may trigger the interception process that may in turn trigger the Cx cache entry creation in SC1 consistent with embodiments of the disclosure. This interception process can be used internally by a CDN to populate caches. It can be used, for example, for content pre-placement purpose. In addition, the interception process consistent with embodiments of the disclosure may be used to individually control all the CDN caches and also used by any individual cache to initiate a caching request against another cache. This aspect, for example, may be used to implement some internal CDN autonomous caching optimization policy.

Figure 3A:
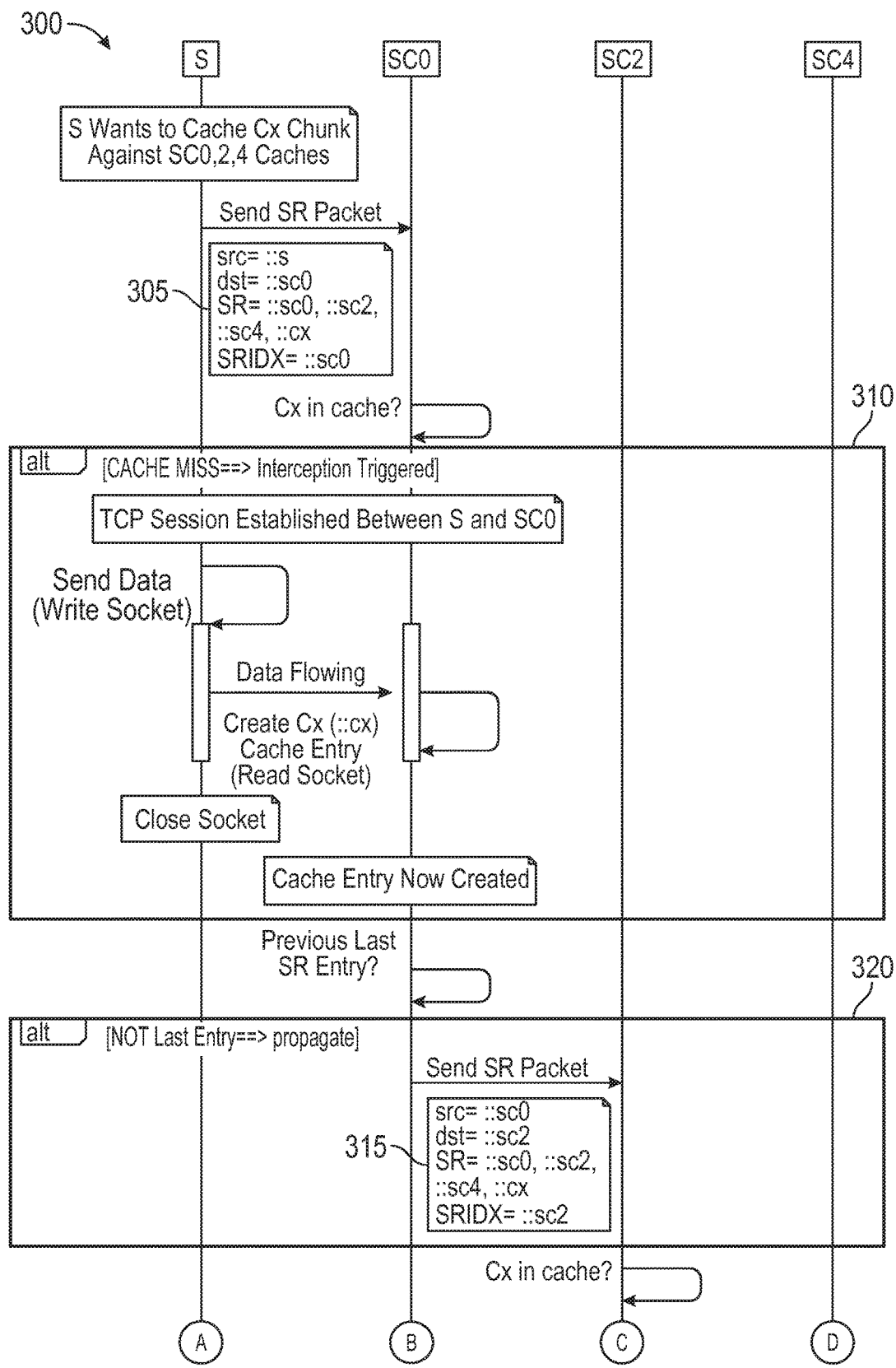
FIG. 3A and FIG. 3B is a state diagram for a multi-caching interception process in accordance with at least one example embodiment.
Figure 3B:
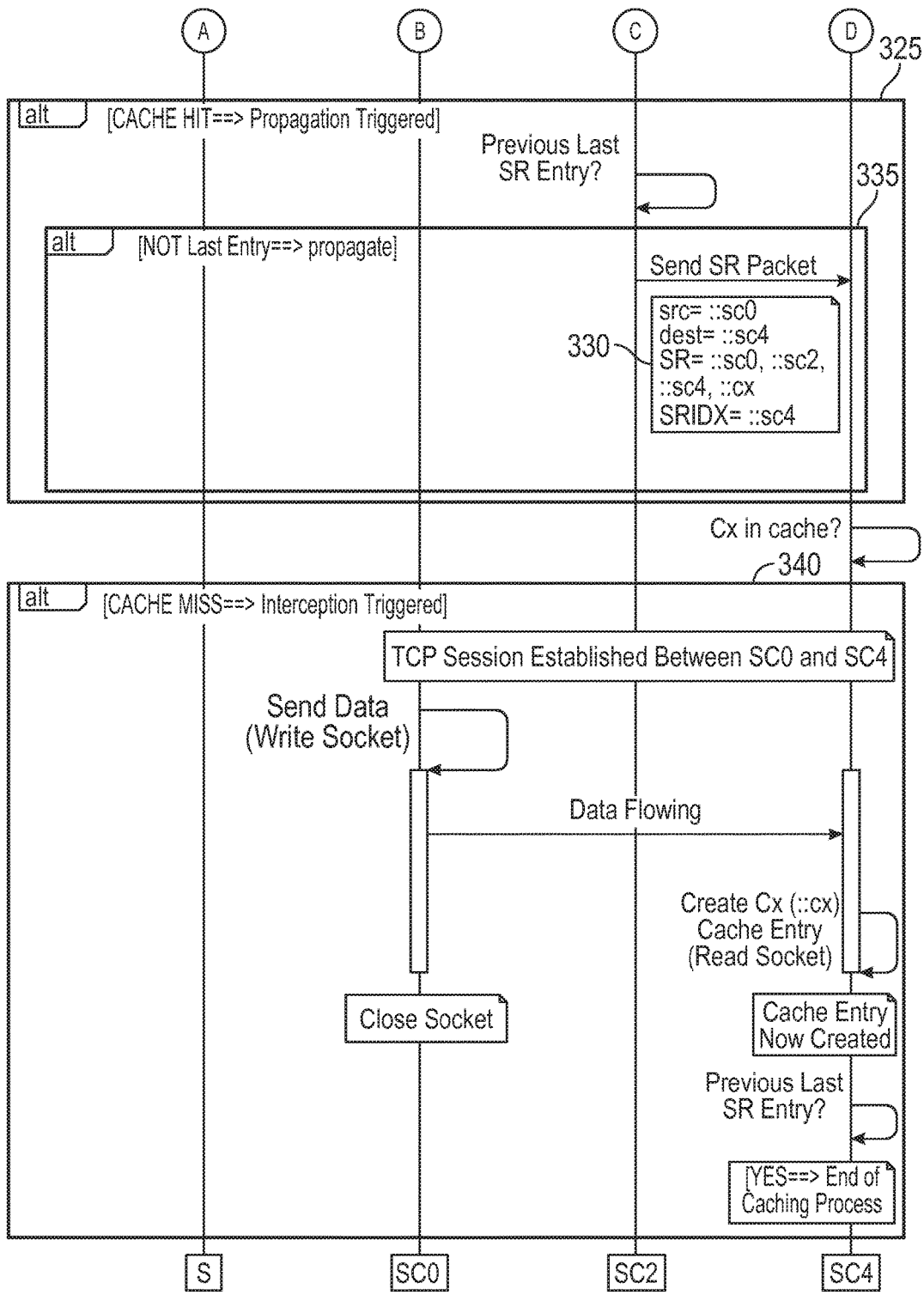

In addition to the interception process shown in FIG. 2, embodiments of the disclosure may include a multi-caching interception process 300 as shown in the state diagram of FIG. 3A and FIG. 3B. As shown in FIG. 3A and FIG. 3B, the S server (e.g., first server 115) may be a source server pushing a popular content against different CDN nodes (e.g., plurality of nodes 105) and may want to store popular content in cache servers SC0, SC2, and SC4 (e.g., third server 130, fourth server 135, and fifth server 140 respectively.)

To achieve this content storage, for each Cx content chunk, the S server may inject, for example, "::sc0, ::sc2, ::sc4, ::cx" in the SR list in the network through a first SR packet 305. As a result, Cx is expected to be first cached in SC0 as illustrated in state 310. Then, consistent with embodiments of the disclosure, a second SR packet 315 may be sent to the next hop in the list (i.e., SC2) as illustrated in state 320. In state 325, a cache hit in SC2 may occur that may mean that Cx may already be available in the SC2 cache.

Next, a third SR packet 330 may be sent to the final hop in the list (i.e., SC4) as illustrated in state 335. As a result, Cx may be cached in SC4 as illustrated in state 340. Consequently, according to embodiments of the disclosure, the S server may propagate Cx from hop-to-hop as designated in SR packets consistent with interception process 300. In the above example interception process 300, there may be: i) a cache miss in SC0 and SC4 resulting in Cx being cached in SC0 and SC4 respectively; and ii) a cache hit in SC2 meaning that Cx may already available in the SC2 cache. This process may be seen as multi-push process where a piece of content may be automatically cached by CDN servers from a well-known list. The other advantage may be that the process may be neutral for servers from the list already having the piece of content in cache.

Since all SCx cache servers (e.g., plurality of nodes 105) shown in FIG. 1 may be SR capable, they may know how to interpret the SR packet they receive. A SCx server may implement some caching management logic where a chunk initially pushed by the S server may be propagated to all cache servers listed in the SR list without any intervention from the S server just by leveraging the interception process. One advantage of this approach may be that it reduces the S server workload.

Embodiments of the disclosure may also include adaptive caching. In the below example, at the beginning, only SC0 (e.g., first server 115) may have the requested chunks in cache. At a given point in time, a device Dy (e.g., user device 175) connected to R4 (e.g., third router 150) may ask for Cx chunk. For this chunk, the DASH manifest may say that the shop list is (::r4, ::sc3, ::sc2::sc0) where SC3 may comprise second router 145 and SC2 may comprise third server 130. Consequently, device Dy may inject (::r4, ::sc3, ::sc2::sc0, ::cx) SR list in the CDN.

R4 may comprise an SR capable router, so it may process the packet as a normal SR packet and send it to the next hop, which happen to be SC3 in this example. The packet may therefore be sent to SC3. SC3 may then receive the packet, and since it can do content delivery, it may check ::cx against its local chunk table. Since Cx is only present in SC0 cache, there may be a cache miss. SC3 may then send the packet to SC2. The same may happen on SC2 and the packet may go to SC0 where there may be a cache hit. SC0 may deliver the CX chunk back to Dy.

Dy may continue to ask for subsequent chunks from the same content (Cx+1, Cx+2, etc.). Consistent with embodiments of the disclosure, SC0 may detect that there may be a high demand coming from Dy (or any of plurality of user devices 110) for these chunks (it may even detect that all these chunks may belong to the same content). And since SC0 knows from the SR lists it receives that there are caches down the path (SC2 and SC3 in this example) toward Dy, it may decide to push Cx, Cx+1 against, for example, SC3.

Symmetrically since SC0 (e.g., first server 115) may be at the top of the logical content distribution hierarchy, the same could happen for requests coming through other paths in operation environment 100. Since the SR list used by plurality of devices 110 to fetch content may be an ordered list, any SCx server (e.g., any of plurality of nodes 105) may determine what its relative position in the hierarchy in the CDS is.

Consistent with other embodiments of the disclosure, due to the symmetric mechanism used by devices (e.g., plurality of devices 110) to access content, SCx servers (e.g., plurality of nodes 105) may create information out of the requests they receive. A CDN cache server high in the SR list that may receive a lot of requests may, for example, deduce that servers down the path were not able to deliver the requested piece of content, which may mean that either they may be overloaded or, more likely, that they may not have it in cache. Based on this information, the SCx cache servers may leverage the interception process described above to proactively push chunks against servers down the path from the SR lists observed by the corresponding SCx servers, thus contributing to limit network congestion further up in the network.

Consistent with other embodiments of the disclosure, an SCx server detecting that it receives a lot of requests for the same content for which there is a cache miss may proactively decide to pull this content from a server higher in the hierarchy. In this case, the process used by the SCx server may not be different from the one used by the device to fetch the same piece of content.

The pull mechanism can be generalized to become a multi-pull mechanism where an SCx server pulling a piece of content from a SR list may trigger a cascade of pull atomic actions where all SCx servers from the SR list may get the content. In the above example, SC3 may trigger SC3 as well as SC2 to fetch content from SC0, for example.

Consistent with other embodiments of the disclosure, these push, multi-push, as well as multi-pull mechanisms combined together, may enable a set of SCx CDN cache nodes to collaborate at a very high frequency to optimize the global CDN caching efficiency. There may be some CDN cache server configuration parameters defining how servers may react to the observed request, thus defining a set a behavioral laws globally defining how the whole system (e.g., operating environment 100) may react.

Figure 4:
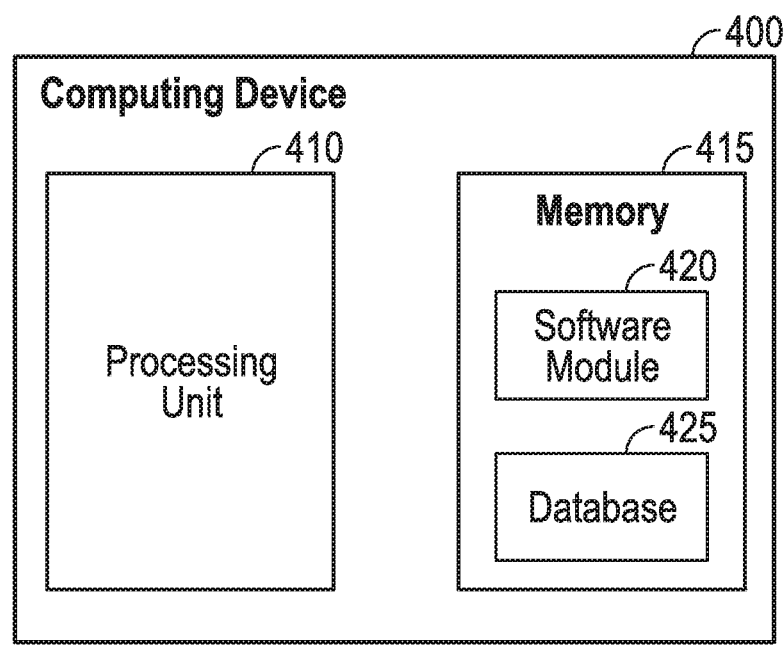
FIG. 4 is a block diagram of a computing device in accordance with at least one example embodiment.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform processes for providing content distribution system cache management, including for example, any one or more of the stages from method 200 and method 300 described above with respect to FIG. 2, FIG. 3A, and FIG. 3B. Computing device 400, for example, may provide an operating environment for any one or more of plurality of nodes 105 and plurality of user devices 110. Any one or more of plurality of nodes 105 and plurality of user devices 110 may operate in other environments and is not limited to computing device 300.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. Furthermore, computing device 400 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a first cache server, a first sync packet from a first server, the first sync packet comprising a first source address, a first destination address, a segment routing address, and a first segment routing index, the segment routing address comprising an ordered list of cache servers where a chunk is to be stored and an address for the chunk, the first segment routing index identifying a next destination address, the first cache server being a first entry in the ordered list;

obtaining, by the first cache server, the address for the chunk by parsing the first sync packet;

determining, by the first cache server, that the chunk is not stored on the first cache server, wherein determining that the chunk is not stored on the first cache server comprises using the address for the chunk;

opening, in response to determining that the chunk is not stored on the cache server, a connection between a first server and the first cache server;

receiving, by the first cache server, the chunk over the connection;

caching, by the first cache server, the chunk on the first cache server;

creating, by the first cache server, a second sync packet comprising a second source address, a second destination address, the segment routing address, and a second segment routing index, the segment routing address comprising the ordered list of the cache servers where the chunk is to be cached, the second destination address corresponding to a second cache server associated with a second entry on the ordered list, and the second segment routing index identifying a different next destination address; and sending, by the first cache server, the second sync packet to the second cache server.

2. The method of claim 1, wherein the first sync packet indicates the first server as a source for the chunk and the first cache server as a destination for the chunk.

3. The method of claim 1, wherein receiving the first sync packet comprises receiving the first sync packet from the first server through a router that knows the route between the first server and the first cache server.

4. The method of claim 1, wherein determining that the chunk is not stored on the first cache server comprises determining that there is no match for the address for the chunk in a lookup table located on the first cache server.

5. The method of claim 1, wherein opening the connection between the first server and the first cache server comprises:
creating, by the first cache server, a sync/acknowledge packet;
sending, by the first cache server, the sync/acknowledge packet to the first server;
receiving, by the first cache server, an acknowledge packet from the first server, the acknowledge packet being created by the first server in response to receiving the sync/acknowledge packet; and
opening, in response to the cache server receiving the acknowledge packet, a socket between the first server and the first cache server.

6. The method of claim 5, wherein receiving, by the first cache server, the chunk over the connection comprises:
reading, by the first cache server, data corresponding to the chunk written by the first server to the socket.

7. The method of claim 6, further comprising closing the socket when the chunk has been completely cached on the first cache server.

8. An apparatus comprising:
a memory storage; and
a processing unit coupled to the memory storage, wherein the processing unit is operative to:
receive a first sync packet from a first server, the first sync packet comprising a first source address, a first destination address, a segment routing address, and a first segment routing index, the segment routing address comprising an ordered list of a plurality of apparatus where a chunk is to be stored, the first segment routing index identifying a next destination address, the apparatus being a first entry in the ordered list;
obtain an address for the chunk by parsing the sync packet;
determine that the chunk is not stored on the memory storage, wherein determining that the chunk is not stored on the memory storage comprises using the address for the chunk;
open, in response to determining that the chunk is not stored on the memory storage, a connection between the first server and the apparatus;
receive the chunk over the connection;
cache the chunk on the memory storage; and
send the first sync packet to another apparatus associated with a second entry on the ordered list, wherein the processing unit being operable to send the first sync packet to the another apparatus comprises the processing unit being operative to modify, before sending the first sync packet to the another apparatus, the first source address associated with the first server to a second source address associated with the apparatus, the first destination of the first sync packet from the apparatus to a second destination the another apparatus, and the first segment routing index associated with the apparatus to a second segment routing index associated with the another apparatus.

9. The apparatus of claim 8, wherein the processing unit is operative to receive the first sync packet from the first server through a router that knows the route between the first server and the apparatus.

10. The apparatus of claim 8, wherein the processing unit being operative to determine that the chunk is not stored on the apparatus comprises the processing unit being operative to determine that there is no match for the address for the chunk in a lookup table located on the memory storage.

11. The apparatus of claim 8, wherein the processing unit being operative to open the connection between the first server and the apparatus comprises the processing unit being operative to:
create a sync/acknowledge packet;
send the sync/acknowledge packet to the first server;
receive an acknowledge packet from the first server; and
open, in response to receiving the acknowledge packet, a socket between the first server and the apparatus.

12. The apparatus of claim 11, wherein the processing unit being operative to receive the chunk over the connection comprises the processing unit being operative to read data corresponding to the chunk from the socket, the data being written to the socket by the first server.

13. The apparatus of claim 12, further comprising the processing unit being operative to close the socket when the chunk has been completely cached on the memory storage.

14. A method comprising:
creating, by a source server, a first segment routing packet, the first segment routing packet including a first source address, a first destination address, a segment routing address, and a first segment routing index, the segment routing address comprising an ordered list comprising a plurality of cache servers where a chunk is to be stored, the first segment routing index identifying a next destination address;

receiving, by the first cache server, the first segment routing packet from the source server, the first cache server being a first entry on the ordered list;

obtaining, by the first cache server, an address for the chunk by parsing the first segment routing packet;

determining, by the first cache server, that the chunk is not stored on the first cache server, wherein determining that the chunk is not stored on the first cache server comprises using the address for the chunk;

opening, in response to determining that the chunk is not stored on the first cache server, a first connection between the source server and the first cache server;

receiving, by the first cache server, the chunk over the first connection;

caching, by the first cache server, the chunk on the first cache server;

creating, by the first cache server, a second segment routing packet, the second segment routing packet comprising a second source address, a second destination address, the segment routing address, and a second segment routing index, the segment routing address comprising the ordered list, the second destination address corresponding to a second cache server associated with a second entry on the ordered list, and the second segment routing index identifying a different next destination address;

sending, by the first cache server, the second segment routing packet to the second cache server;

receiving, by the second cache server, the second segment routing packet from the first cache server;

obtaining, by the second cache server, the address for the chunk by parsing the second segment routing packet; and determining, by the second cache server, that the chunk is already stored on the second cache server, wherein determining that the chunk is already stored on the second cache server comprises using the address for the chunk.

15. The method of claim 14, further comprising:

creating, by the second cache server, a third segment routing packet, the third segment routing packet including the ordered list indicating the destination address corresponding to a third cache server associated with a third entry on the ordered list;

receiving, by the third cache server, the third segment routing packet from the second cache server;

obtaining, by the third cache server, the address for the chunk by parsing the third segment routing packet;

determining, by the third cache server, that the chunk is not stored on the third cache server, wherein determining that the chunk is not stored on the third cache server comprises using the address for the chunk;

opening, in response to determining that the chunk is not stored on the third cache server, a second connection between the first cache server and the third cache server;

receiving, by the third cache server, the chunk over the first connection; and caching, by the third cache server, the chunk on the third cache server.

16. The method of claim 14, wherein creating the first segment routing packet comprises creating the first segment routing packet wherein the first segment routing packet indicates the source server as a source for the chunk and the first cache server as the destination for the chunk.

17. The method of claim 14, wherein determining that the chunk is not stored on the first cache server comprises determining that there is no match for the address for the chunk in a lookup table located on the first cache server.

18. The method of claim 14, wherein opening the first connection between the source server and the first cache server comprises:

creating, by the first cache server, a sync/acknowledge packet;

sending, by the first cache server, the sync/acknowledge packet to the source server;

receiving, by the source server, the sync/acknowledge packet;

creating, by the source server in response to receiving the sync/acknowledge packet, an acknowledge packet;

sending, by the source server, the acknowledge packet to the first cache server;

receiving, by the first cache server, the acknowledge packet; and opening, in response to the first cache server receiving the acknowledge packet, a socket between the source server and the first cache server.

19. The method of claim 18, wherein receiving, by the first cache server, the chunk over the first connection comprises:

writing, by the source server, data corresponding to the chunk in the socket; and reading, by the first cache server, the data corresponding to the chunk from the socket.

20. The method of claim 19, further comprising closing the socket when the chunk has been completely cached on the first cache server.

* * * * *